US007836098B2

(12) United States Patent
Baby et al.

(10) Patent No.: US 7,836,098 B2
(45) Date of Patent: Nov. 16, 2010

(54) ACCELERATING VALUE-BASED LOOKUP OF XML DOCUMENT IN XQUERY

(75) Inventors: Thomas Baby, Foster City, CA (US); Sivasankaran Chandrasekar, Palo Alto, CA (US); Asha Tarachandani, Newark, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 359 days.

(21) Appl. No.: 11/827,801

(22) Filed: Jul. 13, 2007

(65) Prior Publication Data

US 2009/0019077 A1    Jan. 15, 2009

(51) Int. Cl.
*G06F 7/00* (2006.01)
*G06F 17/30* (2006.01)
(52) U.S. Cl. .................................. 707/803; 707/696
(58) Field of Classification Search ................... 707/803
See application file for complete search history.

(56) References Cited

U.S. PATENT DOCUMENTS

| | | | |
|---|---|---|---|
| 5,193,533 A | 3/1993 | Body et al. |
| 5,210,686 A | 5/1993 | Jernigan |
| 5,369,763 A | 11/1994 | Biles |
| 5,404,513 A | 4/1995 | Powers et al. |
| 5,410,691 A | 4/1995 | Taylor |
| 5,454,101 A | 9/1995 | Mackay et al. |
| 5,467,471 A | 11/1995 | Bader |
| 5,514,112 A | 5/1996 | Chu et al. |
| 5,524,240 A | 6/1996 | Barbara et al. |
| 5,530,849 A | 6/1996 | Hanushevsky et al. |
| 5,544,360 A | 8/1996 | Lewak et al. |

(Continued)

FOREIGN PATENT DOCUMENTS

WO    WO 01/42881 A2    6/2001

(Continued)

OTHER PUBLICATIONS

International Searching Authority, "Notification of Transmittal of the International Search Report and the Written Opinion of the International Searching Authority, or the Declaration," PCT/US2005/021259, dated Nov. 24, 2005, 13 pages.

(Continued)

*Primary Examiner*—Kuen S Lu
*Assistant Examiner*—Tuan Pham
(74) *Attorney, Agent, or Firm*—Hickman Palermo Truong & Becker LLP

(57) ABSTRACT

A method and apparatus for accelerating value-based lookups of XML documents in XQuery is provided. XML indices can help to optimize SQL queries of XML documents stored in object-relational databases. Certain SQL/XML functions such as XMLTABLE( ) use XQuery expressions to query XML documents. Previously, such queries could not use the XML index because the PATH table of the XML index was not defined for XQuery semantics. Techniques described herein extend the XML index for use with queries that require evaluation of XQuery expressions. Consequently, techniques described herein accelerate value-based lookups of XML documents in XQuery by introducing the possibility of an index-assisted evaluation of XQuery expressions.

28 Claims, 4 Drawing Sheets

U.S. PATENT DOCUMENTS

| | | |
|---|---|---|
| 5,546,571 A | 8/1996 | Shan et al. |
| 5,568,640 A | 10/1996 | Nishiyama et al. |
| 5,643,633 A | 7/1997 | Telford et al. |
| 5,680,614 A | 10/1997 | Bakuya et al. |
| 5,701,467 A | 12/1997 | Freeston |
| 5,795,322 A | 8/1998 | Boudewijn |
| 5,838,965 A | 11/1998 | Kavanagh et al. |
| 5,842,212 A | 11/1998 | Balluvio et al. |
| 5,870,590 A | 2/1999 | Kita et al. |
| 5,878,415 A | 3/1999 | Olds |
| 5,917,492 A | 6/1999 | Bereiter et al. |
| 5,921,582 A | 7/1999 | Gusack |
| 5,964,407 A | 10/1999 | Sandkleiva |
| 5,974,407 A | 10/1999 | Sacks |
| 5,987,506 A | 11/1999 | Carter et al. |
| 6,038,563 A | 3/2000 | Bapat et al. |
| 6,055,544 A | 4/2000 | DeRose et al. |
| 6,061,684 A | 5/2000 | Glasser et al. |
| 6,101,500 A | 8/2000 | Lau |
| 6,111,578 A | 8/2000 | Tesler |
| 6,112,209 A | 8/2000 | Gusack |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmone |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,330,573 B1 | 12/2001 | Salisbury et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,427,123 B1 | 7/2002 | Sedlar |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,539,398 B1 | 3/2003 | Hannan et al. |
| 6,604,100 B1 | 8/2003 | Fernandez et al. |
| 6,609,121 B1 | 8/2003 | Ambrosini et al. |
| 6,636,845 B2 | 10/2003 | Chau et al. |
| 6,643,633 B2 | 11/2003 | Chau et al. |
| 6,684,227 B2 | 1/2004 | Duxbury |
| 6,697,805 B1 | 2/2004 | Choquier et al. |
| 6,708,186 B1 | 3/2004 | Claborn et al. |
| 6,725,212 B2 | 4/2004 | Couch et al. |
| 6,772,350 B1 | 8/2004 | Belani et al. |
| 6,785,673 B1 | 8/2004 | Fernandez et al. |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,920,457 B2 | 7/2005 | Pressmar |
| 7,031,956 B1 | 4/2006 | Lee et al. |
| 7,043,488 B1 | 5/2006 | Bauer et al. |
| 7,047,253 B1 | 5/2006 | Murthy et al. |
| 7,089,239 B1 | 8/2006 | Baer et al. |
| 7,097,653 B2 | 8/2006 | Freudenthal et al. |
| 7,139,746 B2 | 11/2006 | Shin et al. |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,216,127 B2 | 5/2007 | Auerbach |
| 2001/0037345 A1 | 11/2001 | Kiernan et al. |
| 2001/0049675 A1 | 12/2001 | Mandler et al. |
| 2002/0073019 A1 | 6/2002 | Deaton |
| 2002/0078068 A1 | 6/2002 | Krishnaprasad et al. |
| 2002/0103829 A1 | 8/2002 | Manning et al. |
| 2002/0116457 A1 | 8/2002 | Eshleman et al. |
| 2002/0143512 A1 | 10/2002 | Shamoto et al. |
| 2002/0152267 A1 | 10/2002 | Lennon |
| 2002/0156811 A1 | 10/2002 | Krupa |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2003/0009361 A1 | 1/2003 | Hancock et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101194 A1 | 5/2003 | Rys et al. |
| 2003/0131051 A1 | 7/2003 | Lection et al. |
| 2003/0140308 A1 | 7/2003 | Murthy et al. |
| 2003/0177341 A1 | 9/2003 | Devillers |
| 2003/0182624 A1 | 9/2003 | Large |
| 2003/0212662 A1* | 11/2003 | Shin et al. ............ 707/2 |
| 2003/0212664 A1 | 11/2003 | Breining et al. |
| 2004/0010752 A1 | 1/2004 | Chan et al. |
| 2004/0044659 A1 | 3/2004 | Judd et al. |
| 2004/0060006 A1* | 3/2004 | Lindblad et al. ............ 715/513 |
| 2004/0064466 A1 | 4/2004 | Manikutty et al. |
| 2004/0068494 A1 | 4/2004 | Tozawa et al. |
| 2004/0088320 A1 | 5/2004 | Perry |
| 2004/0088415 A1 | 5/2004 | Chandrasekar et al. |
| 2004/0148278 A1 | 7/2004 | Milo et al. |
| 2004/0167864 A1 | 8/2004 | Wang et al. |
| 2004/0205551 A1 | 10/2004 | Santos |
| 2004/0220912 A1 | 11/2004 | Manikutty et al. |
| 2004/0220927 A1 | 11/2004 | Murthy et al. |
| 2004/0225865 A1* | 11/2004 | Cox et al. ............ 712/34 |
| 2004/0230667 A1 | 11/2004 | Wookey |
| 2004/0267760 A1 | 12/2004 | Brundage et al. |
| 2005/0010896 A1 | 1/2005 | Meliksetian et al. |
| 2005/0038688 A1 | 2/2005 | Collins et al. |
| 2005/0050016 A1 | 3/2005 | Stanoi et al. |
| 2005/0091188 A1 | 4/2005 | Pal et al. |
| 2005/0120031 A1 | 6/2005 | Ishii |
| 2005/0228792 A1* | 10/2005 | Chandrasekaran et al. ...... 707/9 |
| 2005/0228818 A1* | 10/2005 | Murthy et al. ............ 707/102 |
| 2005/0229158 A1 | 10/2005 | Thusoo et al. |
| 2005/0257201 A1 | 11/2005 | Rose et al. |
| 2005/0289125 A1 | 12/2005 | Liu et al. |
| 2005/0289175 A1* | 12/2005 | Krishnaprasad et al. ...... 707/102 |
| 2006/0004858 A1* | 1/2006 | Tran et al. ............ 707/104.1 |
| 2006/0053122 A1* | 3/2006 | Korn et al. ............ 707/100 |
| 2006/0100989 A1* | 5/2006 | Chinchwadkar et al. ....... 707/3 |
| 2006/0112090 A1* | 5/2006 | Amer-Yahia et al. ............ 707/4 |
| 2006/0161575 A1* | 7/2006 | Fan et al. ............ 707/102 |
| 2010/0169354 A1 | 7/2010 | Baby |
| 2010/0185683 A1 | 7/2010 | Baby et al. |

FOREIGN PATENT DOCUMENTS

| | | |
|---|---|---|
| WO | WO 01/59602 A1 | 8/2001 |
| WO | WO 01/61566 A1 | 8/2001 |
| WO | WO 03/027908 A2 | 4/2003 |

OTHER PUBLICATIONS

Current Claims, PCT/US2005/021259, 15 pages.

Choi, Byron et al., "The XQuey Formal Semantics: A Foundation for Implementation Optimization," May 31, 2002, IEEE XP-002353605, 15 pages.

Vorthmann, S. et al. "Beyond Schemas, Schema Adjuncts and the Outside World," Markup Languages, Online!, vol. 2, No. 3, Jun. 2000, pp. 1-8.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, IEEE XP-002353604, pp. 1009-1018.

Shanmugasundaram, Jayavel, et al., "Querying XML Views of Relational Data," Proceedings of the 27th Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

Josephin Cheng, et al., "IBM DB2 XML Extender, An end-to-end solution for storing and retrieving XML documents," IEEE, ICDE '00 Conference, San Diego, Feb. 2000, 128 pages.

Jim Melton, "ISO-ANSI Working Draft, XML-Related Specifications (SQL/XML)," WG3: DRS-020, H2-2002-365, Aug. 2002, 154 pages.

Oracle Corporation, "Oracle9iXML Database Developer's Guide—Oracle XML DB," Release 2 (9.2), Mar. 2002, Part No. A96620-1, 64 pages.

W3C, "XML Schema Part 1: Structures," W3C Recommendation, May 2, 2001, retrieved from website: http://www.w3.org/TR/2001/REC-xmlschema-1-20010502/, 94 pages.

W3C, "XML Schema Part 2: Datatypes," W3C Recommendation, May 2, 2001, retrieved from website: http://www.w3.org/TR/2001/REC-xmlschema-2-20010502/, 102 pages.

R. Bourret et al.: A generic Load/Extract Utility for Data Transfer Between XML Documents and Relational Databases, Jun. 8-9, 2000, IEEE computing SOC., pp. 134-143.

Dayen, I., "Storing XML in Relational Databases", XML.com XP-002275971(1998-2004) pp. 1-13.

Funderbunk, J. et al., "XML programming with SQL/XML and XQuery", *IBM Systems Journal* XP-002295973 (2002) pp. 642-665.

Hierarchical Queries, XP-002295972, pp. 8-3 to 8-7.

PCT/US2004/010018—International Search Report and Written Opinion, received Nov. 5, 2004, 14 pages.

PCT/US2004/010018—current claims.

Peng, Feng et al., "Xpath queries on streaming data", 2003, ACM Press, pp. 432-442.

Jean-Yes Vio-Dury, "Xpath on left and right sides of rules: toward compact XML tree rewriting through node patterns", 2003, ACM Press, pp. 19-25.

MacKenzie, David et al., "Finding Files", GNU Findutils Version 4.1.2, Nov. 1994, 38 pages.

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages.

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Wed data Extraction with Standard XML Technologies," WWW10, May 1-5, 2001, pp. 689-696.

Schmidt et al., "Why and How to Benchmark XML Databases," Sigmond Record, vol. 3, No. 3, Sep. 2001, pp. 27-32.

McHugh, Jason et al., "Query Optimization for XML", XP-002333353, *Proceedings of the 25th VLDB Conference* (1999) pp. 315-326.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

European Patent Office, "Notification of Transmittal of the International Search Report and the Written Opinion of the International Searching Authority, or the Declaration", dated Jul. 29, 2005, received from International application No. PCT/US2005/011762.

Pending claims from International application No. PCT/US2005/011762.

International Preliminary Examining Authority, "Notification of Transmittal of the International Preliminary Report of Patentability," PCT/US2005/020795, dated Aug. 7, 2006, 10 pages.

International Preliminary Examining Authority, "Written Opinion of the International Preliminary Examining Authority," PCT/US2005/020795, received May 31, 2006, 5 pages.

Claims, PCT/US2005/020795, 3 pages.

W3C, "XML Fragment Interchange," W3C Working Draft, Jun. 30, 1999, XP-002167090, 17 pages.

Daniele Braga et al., "A Graphical Environment to Query XML Data with Query," Proceedings of the Fourth International Conference on Web Information Systems Engineering (WISE '03), 2003, IEEE, 10 pages.

Diao, Y. et al., "Path Sharing and Predicate Evaluation for High-Performance XML Filtering" XP-002344354 *ACM Transactions on Database Systems* (2003), pp. 467-516.

Diao, Y. et al., "YFilter: Efficient and Scalable Filtering of XML Documents" *IEEE* (2002) 2 pages.

Helmer, S. et al., "Optimized Translations of XPath into Algebraic Expressions Parameterized by Programs Containing Navigational Primitives" *IEEE* (2002) 10 pages.

Notification of Transmittal of the International Search Report and the Written Opinion of the International Searching Authority, or the Declaration for pending international application No. PCT/US2005/020802.

Pending claims for pending international application No. PCT/US2005/020802.

International Searching Authority, "Notification of Transmittal of the International Search Report and the Written Opinion of the International Searching Authority, or the Declaration," PCT/US2005/011763, dated Aug. 1, 2005, 12 pages.

Current Claims, PCT/US2005/011763, 5 pages.

Cooper, Brian F. et al., "A Fast Index for Semistructured Data," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

Kudrass, Thomas, "Management of XML Documents Without Schema in Relational Database Systems," Information and Software Technology, vol. 44, No. 4, Mar. 31, 2002, XP-004347776, pp. 269-275.

Zhang, Wansong, et al., "An Encoding Scheme for Indexing XML Data," E-Commerce and E-Service, 2004, XP-010697639, pp. 526-529.

Chae, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Noser, Hansrudi et al., "Dynamic 3D Visualization of Database-Defined Tree Structures on the WWW by Using Rewriting Systems," 2000, IEEE, XP-002262516, pp. 247-254.

International Searching Authority, "Notification of the Transmittal of the International Search Report and the Written Opinion of the International Searching Authority, or the Declaration," PCT/US2005/020795, Mailing Date Sep. 27, 2005, 13 pages.

Current Claims, PCT/US2005/020795, 5 pages.

Claims, Foreign Application No. 200580018627.9, 3 pages.

State Intellectual Property Office of P.R.C., "Notification of the First Office Action", Foreign Application No. 200580018627.9, mailed Oct. 12, 2007, 9 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the 30th VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

Cheng, Josephine, et al., "IBM DB2 XML Extender, An end-to-end solution for storing and retrieving XML documents," IEEE, ICDE '00 Conference, San Diego, Feb. 2000, 128 pages.

Dayen, I., "Storing XML in Relational Databases", XML.com XP-002275971(1998-2004), pp. 1-13.

Funderbunk, J. et al., "XML programming with SQL/XML and XQuery", IBM Systems Journal XP-002295973 (2002) pp. 642-665.

Hierarchical Queries, XP-002295972, 6 pages.

Melton, Jim, "ISO-ANSI Working Draft, XML-Related Specifications (SQL/XML)," WG3: DRS-020, H2-2002-365, Aug. 2002, 101 pages.

Oracle Corporation, "Oracle9i XML Database Developer's Guide—Oracle XML DB," Release 2 (9.2), Mar. 2002, Part No. A96620-1, 56 pages.

Peng, Feng et al., "Xpath queries on streaming data," 2003, ACM Press, 13 pages.

Vion-Dury, Jean-Yves, "Xpath on left and right sides of rules: toward compact XML tree rewriting through node patterns," 2003, ACM Press, 8 pages.

W3C, "XML Schema Part 1: Structures," W3C Recommendation, May 2, 2001, http://www.w3.org/TR/2001/REC-xmlschema-1-20010502/, 186 pages.

W3C, "XML Schema Part 2: Datatypes," W3C Recommendation, May 2, 2001, http://www.w3.org/TR/2001/REC-xmlschema-2-20010502/, 138 pages.

\* cited by examiner

```
<Person id="5000">
    <Name>
        <regular>Geoff </regular>
        <bold>Lee</bold>
    </Name>
    <Address>1014 Dietz Avenue</Address>
</Person>
```

ACCELERATING VALUE-BASED LOOKUP OF XML DOCUMENT IN XQUERY

CROSS-REFERENCE TO RELATED APPLICATIONS

This application is related to U.S. Pat. No. 7,120,645 issued to Manikutty et al. ("Manikutty"), the entire contents of which are hereby incorporated by reference as if fully set forth herein.

This application is related to U.S. patent application Ser. No. 10/884,311 by Chandrasekar et al. ("Chandrasekar"), the entire contents of which are hereby incorporated by reference as if fully set forth herein.

FIELD OF THE INVENTION

The present invention relates to techniques for searching eXtensible Markup Language (XML) data maintained in a relational database system, and more specifically, for accelerating value-based XQuery lookups of XML documents stored in databases.

BACKGROUND

Querying and searching information contained in XML documents that are stored within an object-relational database can be especially inefficient given certain queries. XML-aware indices, such as described in Chandrasekar, are available for providing quicker access to XML data in response to queries. Apart from XPath, XQuery is another XML query language that was developed for querying XML documents. The SQL/XML extension of SQL allows queries using XPath expressions to be evaluated on XML documents stored natively in a relational database system.

An XML index may be composed of a PATH table and a set of secondary indices on the PATH table. The PATH table contains one row per indexed node of an XML document. Each column of the table contains information associated with the indexed nodes, like the paths of the nodes or the value of the nodes; secondary indices can be built on the columns. An example of a secondary index is a b-tree index on the value column of the PATH table, also referred to as a value index. The XML index may be accessed when a user submits a query referencing one or more XML documents. The query can be decomposed and re-written with expressions that use the PATH table in the manner described in Chandrasekar.

An optimization engine may evaluate an expression using a secondary index in lieu of evaluating directly from the PATH table. A query that includes a value-based search is an example of a type of query that can be optimized by use of a secondary index. To search for a particular value within the XML document, a user may perform a linear search down the value column of the PATH table, performing as many comparisons as there are rows in the PATH table. Executing a search in this manner requires that each row is read from disk, a costly operation that should be minimized. Building a secondary index, like a b-tree index, on the value column would allow for index-based searching, thereby logarithmically reducing disk accesses for each search.

XML indices are especially valuable for accelerating value-based XQuery lookups because determining the string value of a node in XQuery is an expensive operation. Since a value of a node in XQuery is defined as the concatenation of all descendant text nodes of the node, an entire section of the tree hierarchy below the target node in an XML document would need to be accessed and read from disk to determine the string value of a high level node in XQuery.

While the benefit of using an XML index with a value-based query is clear, prior versions of the XML index are not optimized for value-based queries that use the semantics of XQuery. An XML index was previously defined only to store values of simple nodes (i.e., leaf nodes with no children nodes) in the value column of the PATH table, in accordance with the semantics of XPath. The value for complex nodes (i.e., nodes with one or more child nodes) in a PATH table is set to NULL. This is incompatible with the semantics of XQuery, which defines a value of a complex node as the concatenation of all descendant text nodes of the node.

Based on the foregoing, it would be desirable to extend the PATH table infrastructure, especially the value column, to efficiently accommodate queries using XQuery.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques for accelerating value-based lookups of XML documents in XQuery are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

For the purpose of explanation, examples shall be given hereinafter with reference to the following XML document and PATH tables shown in TABLE 1 and TABLE 3, respectively:

TABLE 1 employees.xml

<Person id="5000">
  <Name>
    <regular>Geoff </regular>
    <bold>Lee</bold>

TABLE 1-continued employees.xml

```
    </Name>
    <Address>1014 Dietz Avenue</Address>
</Person>
```

Figures 1A, 1B:
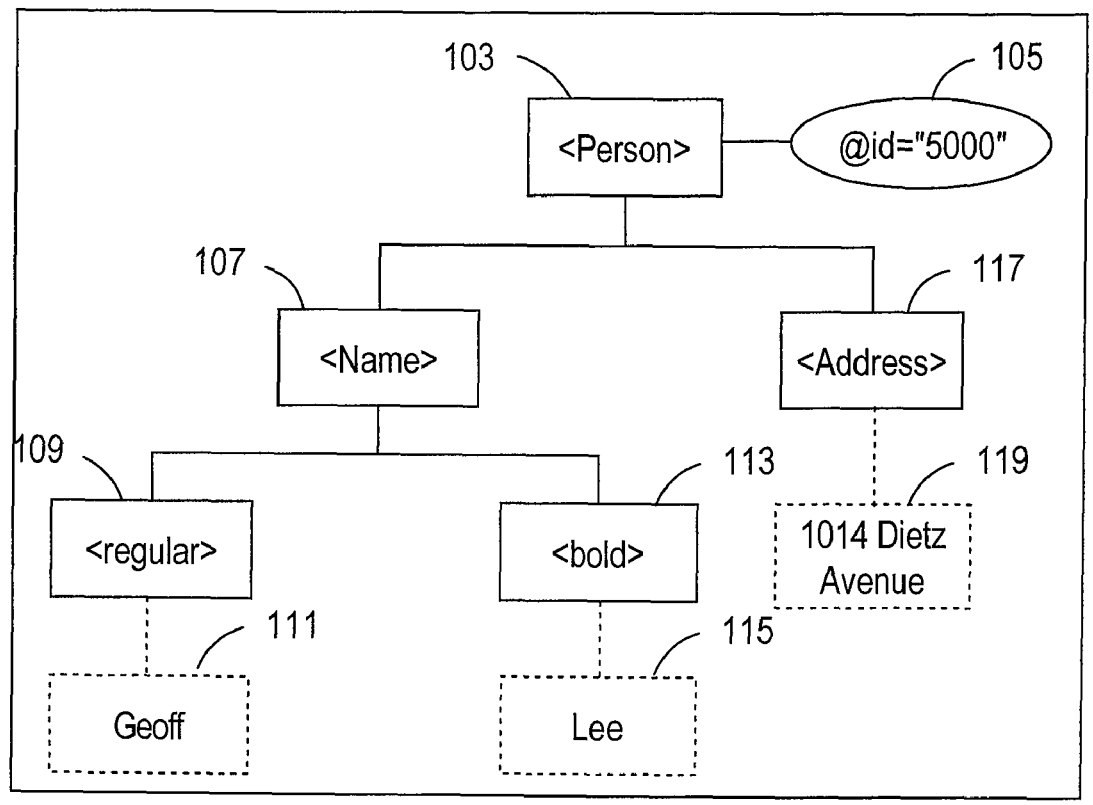
FIGS. 1A and 1B show, in FIG. 1B, a tree diagram representing the example XML document, shown in FIG. 1A, "employees.xml."

As shown in TABLE 1, "employees.xml" is an example of an XML document. The techniques described herein are not limited to XML documents having any particular types, structure, or content. The nodes of "employees.xml" are represented as a hierarchical tree in FIG. 1B.

For the purposes of explanation, the following examples of PathID-to-Path Mapping (TABLE 2) and the PATH table (TABLE 3) were generated based on the preceding XML document shown in TABLE 1.

TABLE 2

PathID-to-Path Mapping

| PathID | Path |
| --- | --- |
| 1 | /Person |
| 2 | /Person/@id |
| 3 | /Person/Name |
| 4 | /Person/Name/regular |
| 5 | /Person/Name/bold |
| 6 | /Person/Address |

TABLE 3

PATH Table

| rowid | rid | PathID | OrderKey | Value | Locator |
| --- | --- | --- | --- | --- | --- |
| 1 | R1 | 1 | 1 | NULL | |
| 2 | R1 | 2 | 1.1 | 5000 | |
| 3 | R1 | 3 | 1.2 | NULL | |
| 4 | R1 | 4 | 1.2.1 | Geoff[ ] | |
| 5 | R1 | 5 | 1.2.2 | Lee | |
| 6 | R1 | 6 | 1.3 | 1014 Dietz Avenue | |

Further details on implementing a PATH table can be found in Chandrasekar. In the following discussion, it will be assumed that "employees.xml" is stored in an object-relational database table called EMPLOYEES. The 'rid' column in the PATH table refers to a row in the base structure that is an object-relational table row containing the XML document "employees.xml."

Value-Based Lookup in XQuery

The following is an example of a value-based lookup of an XML document in XQuery and SQL that will be used to illustrate one embodiment of the invention.

```
SELECT e.object_value
FROM EMPLOYEES e,
    XMLTABLE('/Person/Name'
        PASSING e.object_value
        COLUMNS
            "Name" VARCHAR2(30) PATH '.'
    ) p
WHERE p.Name="Geoff Lee"
```

XMLTABLE is an example of a SQL/XML function that supports the embedding of XQuery to query XML documents that are stored natively in a relational database table. XMLTABLE returns the result in the same form as a relational database table so that it can be queried with SQL like other tables. In the above example, for each row in the passed-in table EMPLOYEES e, XMLTABLE evaluates the XQuery expression '/Person/Name', which gives the row pattern for the rows of the table resulting from evaluating XMLTABLE. The XQuery expression'.' gives the column pattern for a column named "Name", of SQL data type VARCHAR2, of the table resulting from evaluating XMLTABLE. Here, the result of evaluating the XQuery expression '/Person/Name' is the value 'Geoff Lee', concatenated from the child nodes <regular> 109 and <bold> 113 of the node<Name> 107. The FROM clause joins the table e with the table created by XMLTABLE, p. The query returns the rows of e from the column e.object_value having the XML document matching the SQL condition WHERE p.Name="Geoff Lee".

Determining the string value for a node using XQuery requires that all nodes that are descendants of the target node are read from disk, which is a costly operation that should be minimized. Indexing all the concatenated string values for each node would require only one tree navigation when the index is first created; thereafter, value-based lookups can be achieved with the index without further navigation of the original XML document.

Therefore, in one embodiment of the invention, a PATH table would store the value of each node in a separate row, thereby allowing the value to be retrieved more directly in fewer disk-read operations. To use the XML Index, the query submitted by a user is rewritten by the SQL engine at compile-time according to one of the methods described in Manikutty. More specifically, in one embodiment, XQuery operators that compute the value of the node are rewritten to use the value column of the PATH table.

Extending Path Table

In prior approaches, the PATH table, which had been previously defined for XPath semantics, would not be correctly defined for evaluating XQuery expressions because the PATH table did not define values for all nodes as required by XQuery. In XQuery, the string value of a complex node is the concatenation of the string values of all of the complex node's descendant text nodes, in document order. Therefore, under XQuery semantics, the value of /Person/Name is "Geoff Lee," concatenated from the child nodes <regular> 109 and <bold> 113 of the parent node <Name> 107. In contrast, under XPath semantics, which formed the basis of the previous implementation of the PATH table, the value referenced by the XPath/Person/Name is NULL because the node is not a simple node.

Figure 2:
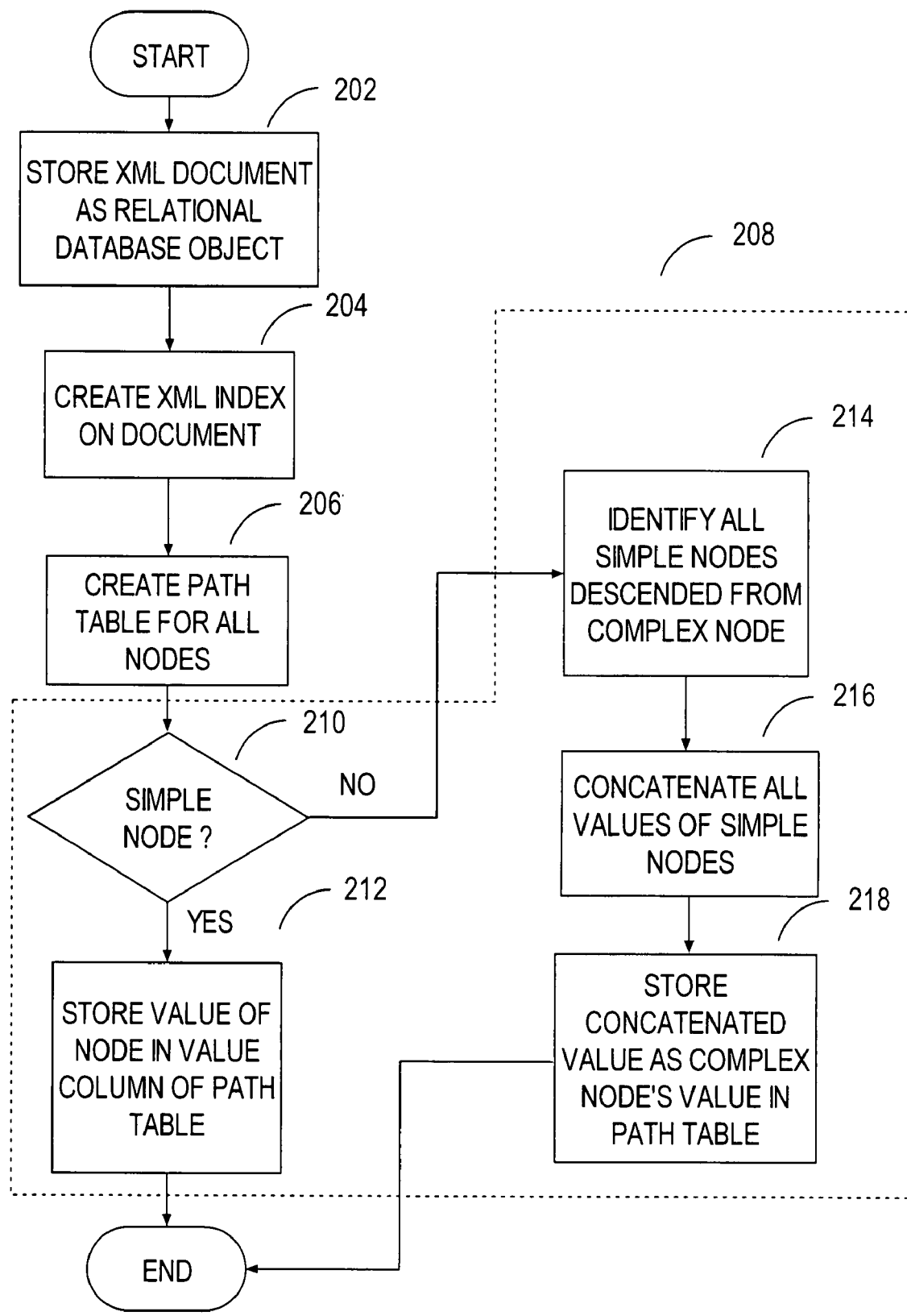
FIG. 2 is a flowchart that represents a technique for extending a PATH table to be compatible with XQuery semantics by populating the value column for all nodes, both simple and complex, according to an embodiment of the invention.

Therefore, in one embodiment of the invention, in order to use the PATH table in evaluating XQuery expressions, the PATH table infrastructure is extended to accommodate the XQuery definition for values. This is accomplished for one embodiment as shown in the flowchart shown in FIG. 2. In one embodiment, a database system stores an XML document as a relational database object (step 202). The database system creates an XML index on the XML document according to the method of Chandrasekar (step 204). In one embodiment, creation of an XML index includes creation of the relational database structure of a PATH table (step 206).

Steps 208 populate the PATH table to extend the method of Chandrasekar according to XQuery semantics. For each row in the PATH table, it is determined whether the node that is referenced in that row is a simple node (step 210). For each simple node, the string value of the node is stored in the value column for that node's row in the PATH table (step 212). For each complex node, the value is determined from the concatenation of all the descendant text nodes of that complex node in document order (steps 214 and 216), and then stored in the value column of that complex node's row in the PATH table (step 218).

TABLE 4 shows the extended PATH table of the XML index for employee.xml that supports XQuery evaluations:

TABLE 4

EXTENDED PATH TABLE

| Rowed | rid | PathID | OrderKey | Value | Locator |
|-------|-----|--------|----------|-------|---------|
| 1 | R1 | 1 | 1 | 5000Geoff Lee1014 Dietz Avenue | |
| 2 | R1 | 2 | 1.1 | 5000 | |
| 3 | R1 | 3 | 1.2 | Geoff Lee | |
| 4 | R1 | 4 | 1.2.1 | Geoff[ ] | |
| 5 | R1 | 5 | 1.2.2 | Lee | |
| 6 | R1 | 6 | 1.3 | 1014 Dietz Avenue | |

In one embodiment, in order to reduce the space overhead incurred by storing more non-null values in the value column, the value stored in step 218 for complex nodes is a prefix of the concatenation of step 216. A prefix of a small size is chosen, such as 200 bytes. In practice, this does not constrain the use of the XML Index because users are unlikely to query string literals longer than 200 bytes, and because casts into the most commonly-available primitive types (such as integer, date, etc.) need only the first 200 bytes of the concatenated string.

Virtual Value Column

In spite of storing in the value column only a prefix of a concatenated string for the value of a complex node in one embodiment, space overhead remains a challenge because a value of a text node is duplicated in the PATH table for the entries of each node along the text node's hierarchical path up to the root node. For example, in an embodiment, if "Geoff" were a text value corresponding to a node one hundred levels deep, then "Geoff" is duplicated one hundred times, once in each level of the path hierarchy for each intermediate node between the "Geoff" node and the root node. In TABLE 4, which represents the extended PATH table for XML document 101, shown in FIG. 1A, "Geoff" is duplicated three times in the value entries of Row 1, Row 3, and Row 4. In one embodiment, such space challenges are resolved by replacing the value column of the PATH table with a virtual column.

In one embodiment, a virtual column does not have any physical presence on disk, but the virtual column can be queried by a user as if that column physically existed. Instead of storing many non-null values for all the nodes of a document in the PATH table, a new operator is evaluated at run-time to compute the value of any node as needed. For a simple node, the new operator returns a prefix of the node's string value. For a complex node, the new operator returns a prefix of the string obtained by concatenating, in document order, the string values of all the descendant simple nodes of the complex node.

This method effectively trades space for extra expression evaluation costs. For infrequently-accessed XML documents, incurring the expression evaluation costs is more efficient in comparison to the cost of the storage space that would be required to support an extended PATH table for every XML document in a database.

The virtual column framework ensures that the value column is not materialized in the table, but yet the value column remains available for defining secondary indices for frequently-accessed documents. In one embodiment, secondary indices are built on either a virtual value column or a physical value column of the new PATH table. Building a secondary index, like a b-tree index, on the value column would allow for index-based searching, thereby logarithmically reducing disk accesses for each search. Such a secondary value index may have keys comprising the concatenated string values of the complex nodes, as well as keys comprising the text values of simple nodes. The keys of the secondary index may be associated with the rowid of a row in the PATH table for nodes having that value. Type-aware secondary indices also may be built by creating appropriate functional indices on the value column, where the function is an appropriate cast operator. Such indices are further described in Chandrasekar.

In one embodiment, the query optimization engine uses the secondary value index as much as possible to evaluate value-based lookups in XQuery. In one embodiment, the virtual column as evaluated during query run-time is used only when the query cannot use a secondary value index.

Accelerating Value-Based Lookup of XML Documents in XQuery

Figure 3:
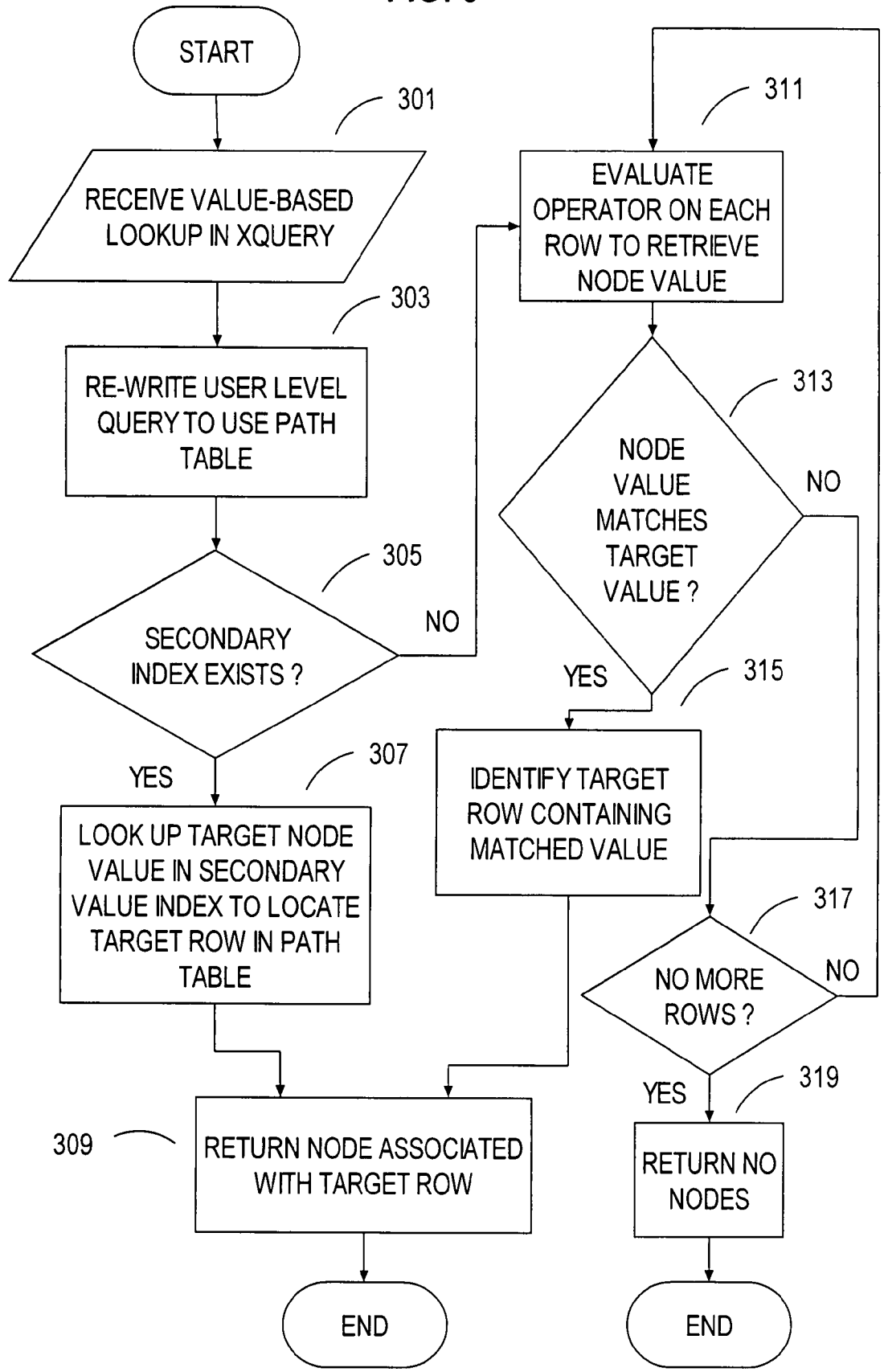
FIG. 3 is a flowchart that represents a technique for accelerating value-based lookup of XML documents in XQuery, according to an embodiment of the invention.

FIG. 3 shows one embodiment of a technique for accelerating a value-based lookup of XML documents in XQuery. In one embodiment, a database system receives a query requiring a value-based lookup in XQuery (step 301). The database system rewrites the query according to one of the methods of Manikutty in order to use the XML Index infrastructure, including the PATH table and any secondary indices on a column of the PATH table, to evaluate the query (step 303). After determining that the query requires a value-based lookup, it is determined whether a secondary index exists on the value column of the PATH table (step 305). If a secondary value index exists, then the secondary value index is navigated to find the entry that has the value that is being searched, and the PATH table rowid that is paired with the value is identified (step 307). The node that is associated with the rowid is returned (step 309).

If a secondary index does not exist on the value column of the PATH table, then the new virtual column operator is evaluated to retrieve the values of the nodes of the XML document (step 311). For each value retrieved, it is determined whether the value matches the value that is being searched (step 313), effectively in the same manner as in navigating a physical value column in a PATH table. If a match is found (step 315), then the node that corresponds to the row in the PATH table associated with the virtual value is returned (step 309). The process repeats until there are no more rows to evaluate (step 317). If there are no more rows, and no matches are found, then no nodes are returned (step 319).

Hardware Overview

Figure 4:
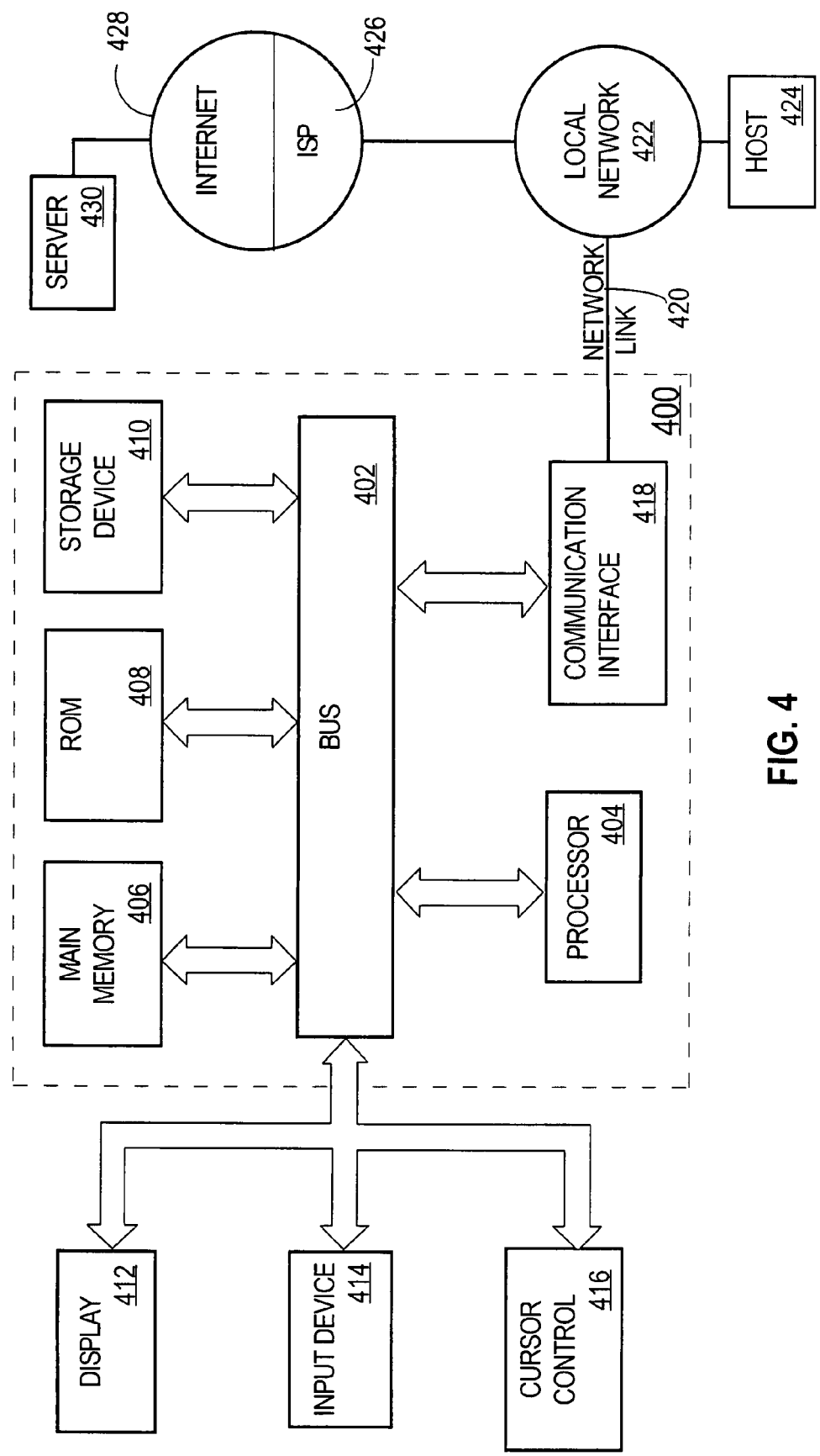
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electro-magnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising machine steps including:
    for each particular node of a set of one or more nodes in a markup language document, storing an entry for the particular node in a first index; and
    for each complex node that is in the set of nodes and has one or more child nodes, performing steps comprising:
        identifying all simple nodes that are descendants of the complex node and that have no child nodes;
        generating, based on the values of a plurality of the simple nodes, a representative node value for the complex node; and
        associating the representative node value with an index entry in the first index for the particular complex node;
    receiving a query conforming to a query language, wherein the query specifies a path-based expression and a target value;
    identifying a set of entries in the first index that are associated with one or more nodes to which the path-based expression refers;
    identifying, from the set of entries, a target entry having a representative node value that matches the target value;
    returning a node associated with the target entry; and
    wherein the steps are performed by one or more computing devices.

2. The method of claim 1, further comprising:
    for each simple node that has no child nodes, associating a node value with an index entry in the first index for the simple node.

3. The method of claim 1, wherein the identifying, generating, and associating steps are executed in response to receiving a query and by executing an operator contained within the query.

4. The method of claim 1, wherein the first index comprises a relational database table, and wherein the associating steps further comprise storing the node values and the representative node values in a column of values in the table.

5. The method of claim 4, wherein said step of identifying, from the set of entries, a target entry having a representative node value that matches the target value, comprises:
    identifying, from the column of values, a matched value that is the same as the target value.

6. The method of claim 1, wherein said set of entries comprises a set of rows in the first index that are associated with the one or more nodes to which the path-based expression refers.

7. The method of claim 1, wherein the path-based expression is written in XQuery and the query comprises XQuery operators.

8. The method of claim 7, wherein the query comprises a value-based lookup in XQuery.

9. The method of claim 1, further comprising:
    storing the node values and the representative node values as keys in a second index, wherein each key is associated with one entry in the first index.

10. The method of claim 9, wherein the second index is a b-tree index.

11. The method of claim 9, wherein identifying, from the set of entries, a target entry having a representative node value that matches the target value, comprises:
    identifying, from the keys, a matched value that is the same as the target value.

12. The method of claim 9, wherein identifying, from the set of entries, a target entry having a representative node value that matches the target value, comprises:
    identifying, from the keys, matched values that are the same as the target value;
    identifying from the second index a set of entries associated with the matched values;
    identifying, from the set of entries of the second index associated with the matched values, a subset of entries that are associated with one or more nodes to which the path-based expression refers; and
    returning one or more nodes associated with the subset of entries.

13. The method of claim 1, wherein the generated representative node value comprises a prefix of a concatenation of the vales of the plurality of the simple nodes, and wherein the prefix comprises the concatenation of the values of the plurality of the simple nodes up to a specified number of bytes.

14. The method of claim 1, wherein at least one of the plurality of simple nodes is a node that is a descendant but not a child of the complex node.

15. An apparatus for accelerating value-based lookups, comprising:
    for each particular node of a set of one or more nodes in a markup language document, means for storing an entry for the particular node in a first index;
    for each simple node that has no child nodes, means for associating a node value with an index entry in the first index for the simple node; and
    for each complex node that is in the set of nodes and has one or more child nodes, means for performing steps comprising:
        means for identifying all simple nodes that are descendants of the complex node and that have no child nodes;
        means for generating, based on the values of a plurality of the simple nodes, a representative node value for the complex node; and
        means for associating the representative node value with an index entry in the first index for the particular complex node;
    means for receiving a query conforming to a query language, wherein the query specifies a path-based expression and a target value;
    means for identifying a set of entries in the first index that are associated with one or more nodes to which the path-based expression refers;
    means for identifying, from the set of entries, a target entry having a representative node value that matches the target value; and
    means for returning a node associated with the target entry.

16. The apparatus of claim 15, further comprising:
    for each simple node that has no child nodes, means for associating a node value with an index entry in the first index for the simple node.

17. A computer-readable storage that stores instructions which, when executed by one or more processors, cause the one of more processors to perform the steps of:
    for each particular node of a set of one or more nodes in a markup language document, storing an entry for the particular node in a first index; and
    for each complex node that is in the set of nodes and has one or more child nodes, performing steps comprising:
        identifying all simple nodes that are descendants of the complex node and that have no child nodes;
        generating, based on the values of a plurality of the simple nodes, a representative node value for the complex node; and associating the representative node value with an index entry in the first index for the particular complex node;

receiving a query conforming to a query language, wherein the query specifies a path-based expression and a target value;

identifying a set of entries in the first index that are associated with one or more nodes to which the path-based expression refers;

identifying, from the set of entries, a target entry having a representative node value that matches the target value; and returning a node associated with the target entry.

18. The computer-readable storage claim 17, further comprising instructions for:

for each simple node that has no child nodes, associating a node value with an index entry in the first index for the simple node.

19. The computer-readable storage of claim 17, wherein the identifying, generating, and associating steps are executed in response to receiving a query and by executing an operator contained within the query.

20. The computer-readable storage of claim 17, wherein the first index comprises a relational database table, and wherein the associating steps further comprise storing the node values and the representative node values in a column of values in the table.

21. The computer-readable storage of claim 20, wherein said step of identifying, from the set of entries, a target entry having a representative node value that matches the target value, comprises instructions for:

identifying, from the column of values, a matched value that is the same as the target value.

22. The computer-readable storage of claim 17, wherein said set of entries comprises a set of rows in the first index that are associated with the one or more nodes to which the path-based expression refers.

23. The computer-readable storage of claim 17, wherein the path-based expression is written in XQuery and the query comprises XQuery operators.

24. The computer-readable storage of claim 23, wherein the query comprises a value-based lookup in XQuery.

25. The computer-readable storage of claim 17, further comprising instructions for:

storing the node values and the representative node values as keys in a second index, wherein each key is associated with one entry in the first index.

26. The computer-readable storage of claim 25, wherein the second index is a b-tree index.

27. The computer-readable storage of claim 25, wherein identifying, from the set of entries, a target entry having a representative node value that matches the target value, comprises instructions for:

identifying, from the keys, a matched value that is the same as the target value.

28. The computer-readable storage of claim 25, further comprising wherein identifying, from the set of entries, a target entry having a representative node value that matches the target value, comprises instructions for:

identifying, from the keys, matched values that are the same as the target value;

identifying from the second index a set of entries associated with the matched values;

identifying, from the set of entries of the second index associated with the matched values, a subset of entries that are associated with one or more nodes to which the path-based expression refers; and returning one or more nodes associated with the subset of entries.

* * * * *

UNITED STATES PATENT AND TRADEMARK OFFICE
CERTIFICATE OF CORRECTION

| | | |
|---|---|---|
| PATENT NO. | : 7,836,098 B2 | Page 1 of 1 |
| APPLICATION NO. | : 11/827801 | |
| DATED | : November 16, 2010 | |
| INVENTOR(S) | : Thomas Baby et al. | |

It is certified that error appears in the above-identified patent and that said Letters Patent is hereby corrected as shown below:

In column 10, line 13, in claim 13, delete "vales" and insert -- values --, therefor.

In column 11, line 14, in claim 18, delete "storage" and insert -- storage of --, therefor.

Signed and Sealed this
Second Day of August, 2011

David J. Kappos
*Director of the United States Patent and Trademark Office*